US012730257B2

(12) United States Patent
Wang et al.

(10) Patent No.: US 12,730,257 B2
(45) Date of Patent: Sep. 8, 2026

(54) OPTICAL FIBER WITH WIDE BANDWIDTH AND HIGH GAINS IN O+E BAND AND REGULATION METHOD THEREOF

(71) Applicant: Shanghai University, Shanghai (CN)

(72) Inventors: Tingyun Wang, Shanghai (CN); Jianxiang Wen, Shanghai (CN); Yanhua Dong, Shanghai (CN); Xiaobei Zhang, Shanghai (CN); Yi Huang, Shanghai (CN); Weiqi Wang, Shanghai (CN)

(73) Assignee: Shanghai University, Shanghai (CN)

( * ) Notice: Subject to any disclaimer, the term of this patent is extended or adjusted under 35 U.S.C. 154(b) by 305 days.

(21) Appl. No.: 18/439,137

(22) Filed: Feb. 12, 2024

(65) Prior Publication Data

US 2024/0319434 A1 Sep. 26, 2024

(30) Foreign Application Priority Data

Mar. 23, 2023 (CN) ......................... 202310290976.6

(51) Int. Cl.
*G02B 6/02* (2006.01)
*G02B 6/028* (2006.01)
*G02B 6/036* (2006.01)

(52) U.S. Cl.
CPC ..... *G02B 6/02042* (2013.01); *G02B 6/02342* (2013.01); *G02B 6/028* (2013.01); *G02B 6/03688* (2013.01)

(58) Field of Classification Search
CPC ............................ G02B 6/02042; G02B 6/028
See application file for complete search history.

(56) References Cited

FOREIGN PATENT DOCUMENTS

CN 115032735 B * 1/2023 ......... G02B 6/02042

OTHER PUBLICATIONS

Translation of CN-115032735-B (Year: 2023).*

* cited by examiner

*Primary Examiner* — Chad H Smith
(74) *Attorney, Agent, or Firm* — Victor Cardona, Esq; Heslin Rothenberg Farley & Mesiti P.C.

(57) ABSTRACT

An optical fiber with wide bandwidth and high gain in an O+E band and a regulation method thereof are disclosed. The optical fiber includes a core and a cladding (0). The core includes a first loose layer (1), a first core layer (2), a second loose layer (3), a second core layer (4) and an inner core (5) from outside to inside. The first loose layer (1) and the second loose layer (3) are made of a silica material doped with high-refractive-index $GeO_2$ and $P_2O_5$. In the first core layer (2) and the second core layer (4), $Al_2O_3$, bismuth oxide and PbO are sequentially doped. The gain performance of the optical fiber is controlled by adjusting doping molar ratios of $Al_2O_3$, bismuth oxide and PbO. The co-doped silica optical fiber maintains fiber gains exceeding 15 dB in a wavelength range of 1260 to 1460 nm.

8 Claims, 3 Drawing Sheets

OPTICAL FIBER WITH WIDE BANDWIDTH AND HIGH GAINS IN O+E BAND AND REGULATION METHOD THEREOF

CROSS REFERENCE TO RELATED APPLICATION

This patent application claims the benefit and priority of Chinese Patent Application No. 202310290976.6, filed with the China National Intellectual Property Administration on Mar. 23, 2023, the disclosure of which is incorporated by reference herein in its entirety as part of the present application.

TECHNICAL FIELD

The present disclosure relates to an optical fiber structure and a performance regulation method thereof.

BACKGROUND

With the rapid development of big data and the Internet, the capacity demand for optical fiber communication systems is experiencing explosive growth. Hence, the improvement in the performance of optical fiber amplifiers is of utmost importance for the development of optical communication systems. Due to the 4f-4f orbital constraints, the gain bandwidth of traditional erbium-doped silica optical fibers is limited to around 35 nm. For the advancement of optical communication systems, breakthroughs in other wavelength bands are urgently needed.

In recent years, bismuth (Bi)-doped optical fibers have exhibited broadband fluorescence characteristics in the near-infrared wavelength range, attracting widespread attention and research. Depending on the core composition, structure and pump wavelength, bismuth-doped optical fiber amplifiers can provide gain in the range of 1000-1600 nm. In comparison to rare-earth (RE) ions, the optical transitions in bismuth-related active centers (BACs) are related to the unshielded outer electron shell of bismuth atoms or ions. Therefore, the wavelength of transitions and the structure of energy levels largely depend on the base of the main glass. By altering the composition of the main glass, the emission wavelength range and optical amplification range of the bismuth-doped glass can be adjusted. Additionally, lead is an element adjacent to bismuth in the periodic table and has a similar outer electron structure. Through investigation and research, it has been found that lead-doped glass materials exhibit similar luminescent characteristics and activation centers as bismuth. Therefore, based on bismuth-doped silica optical fibers, lead is introduced to further explore issues such as the luminous efficiency of different bismuth-related active centers. Using atomic layer deposition (ALD) and modified chemical vapor deposition (MCVD) technologies, an O+E ultra-broadband and high-gain Bi/P/Ge/Pb co-doped silica optical fiber amplifier has been developed.

In 2015, Chinese Patent Application No. 201510941655.3 proposed using the atomic layer deposition (ALD) technology to alternately deposit Bi and Er ions or Bi, Er, and Al ions into an optical fiber core, to produce a Bi/Er or Bi/Er/Al co-doped silica optical fiber. This optical fiber can achieve ultra-broadband amplification in the wavelength ranges of 1000-1380 nm and 1450-1800 nm. In the same year, Chinese Patent Application No. 201510026738.X proposed a preparation method for tube-melt co-drawn bismuth-doped optical fiber, avoiding the fluorescence quenching caused by the aggregation of bismuth ions in the preform-drawing method. However, the preparation process requires strict temperature and other condition controls, significantly increasing the difficulty of preparation process. In 2019, Chinese Patent Application No. 201980059860.3 demonstrated and described a bismuth-doped optical fiber and a bismuth-doped optical fiber amplifier. However, the gain bandwidth in the O band is narrow, limited within the range of 1270 nm to 1310 nm, and is greatly influenced by the system structure. In 2020, Chinese Patent Application No. 202010073619.0 proposed a method for preparing a Bi/Er/La/Al co-doped silica optical fiber based on high-temperature doping, improved modified chemical vapor deposition (MCVD) and ALD or liquid-phase doping processes, high-temperature evaporation doping processes, and external vapor deposition processes. This fiber exhibits broad fluorescence in the range of 1530-1625 nm, with gains of 10-35 dB in the C+L band. This patent mainly introduces lead on the basis of bismuth-doped silica optical fibers to further explore the luminous efficiency and wide-spectrum gain characteristics of different bismuth-related active centers. It utilizes ALD and MCVD technologies to develop an ultra-broadband, high-gain Bi/P/Ge/Pb co-doped silica optical fiber, fiber amplifiers and optical fiber lasers in the O+E band.

SUMMARY

The present disclosure addresses the challenges that it is difficult to expand the gain bandwidth for the current erbium-doped silica optical fiber, and the optical fiber has a narrow gain bandwidth in the O+E band; the preparation process requires a high temperature, making the optical fiber difficult to prepare; moreover, the optical fiber is significantly influenced by system structures. The present disclosure provides a method that modulates a local field of active particles and improves the gain performance of the optical fiber.

Building upon the existing patents and combining the characteristics of ALD and MCVD preparation processes, the present disclosure takes advantage of the similar outer electron structures of lead and bismuth elements and takes into consideration that lead-doped glass materials exhibit similar luminescent characteristics and active centers as bismuth. By controlling the deposition sequence and doping content of Bi, P, Ge and Pb elements, the present disclosure precisely adjusts the local field of the doping ions and substrate material to achieve ultra-broadband gain from 1260 nm to 1460 nm, breaking the previous bandwidth limitation in the O+E band. The controlled co-doping of Bi and Pb elements promotes the formation of BAC-P and PAC-P, enhancing the luminous efficiency within the range of 1260 nm to 1360 nm. Additionally, by adjusting the doping content of Ge elements, the present disclosure extends the gain bandwidth within the range of 1360 nm to 1460 nm while ensuring luminous efficiency in the range of 1260 nm to 1360 nm. The ALD technology enables precise control of material doping concentration at the atomic level, providing uniform and multi-element doping. The Bi/P/Ge/Pb co-doped silica optical fiber prepared using this method exhibits gains greater than 15 dB in the wavelength range of 1260-1460 nm, particularly exhibiting a maximum gain of 20-40 dB at 1420 nm.

The following technical solutions are adopted in the present disclosure.

An optical fiber with wide bandwidth and high gains in an O+E band is provided, including a core and a cladding 0. The core includes a first loose layer 1, a first core layer 2, a second loose layer 3, a second core layer 4, and an inner core 5 from outside to inside. The first loose layer 1, the second loose layer 3, and the inner core 5 are made of a silica material doped with high-refractive-index $GeO_2$ and $P_2O_5$. In the first core layer 2 and the second core layer 4, $Al_2O_3$, bismuth oxide, and PbO are sequentially doped.

In the first core layer 2 and the second core layer 4, a molar ratio of $Al_2O_3$ to bismuth oxide is varied from 0.5 to 20, and a molar ratio of bismuth oxide to PbO is varied from 0.2 to 30.

The cladding 0 of the optical fiber has a diameter of 120 to 130 μm, and the core has a diameter of 8 to 12 μm. A refractive index difference between the cladding 0 and the core is 0.005 to 0.0012.

A method for regulating fiber bandwidth and gain in an O+E band is provided, including: depositing a $SiO_2$ material doped with $GeO_2$ and $P_2O_5$ on an inner wall of a base tube to form a first loose layer 1; sequentially depositing $Al_2O_3$, bismuth oxide, and PbO on the first loose layer 1; then depositing the $SiO_2$ material doped with $GeO_2$ and $P_2O_5$ again to form a second loose layer; sequentially depositing $Al_2O_3$, bismuth oxide, and PbO on the second loose layer; and finally, depositing a silica material doped with $GeO_2$ and $P_2O_5$ and performing preform collapsing and fiber drawing to form an optical fiber. By adjusting the deposition sequence and doping ratios of $Al_2O_3$, bismuth oxide, PbO, $P_2O_3$, and $GeO_2$, the local field distribution of the doping ions and substrate material is controlled, thereby improving the luminous efficiency and gain intensity of the optical fiber, expanding the gain spectrum and enhancing the gain performance of the optical fiber.

The molar ratio of $Al_2O_3$ to bismuth oxide is varied from 0.5 to 20, and the molar ratio of bismuth oxide to PbO is varied from 0.2 to 30.

When an ALD technology is used to sequentially deposit $Al_2O_3$, bismuth oxide, and PbO, an O-source precursor material is ozone or deionized water, an Al-source precursor is trimethylaluminum, a Bi-source precursor is tris(2,2,6,6-tetramethyl-3,5-heptanedionato) bismuth ($Bi(tmhd)_3$), and a Pb-source precursor is bis(2,2,6,6-tetramethyl-3,5-heptanedionato) lead ($Pb(tmhd)_2$).

A Bi-source heating temperature is controlled at 200 to 300° C. with a pulse time of 200 to 400 ms. A Pb-source heating temperature is controlled at 100 to 200° C. with a pulse time of 200 to 400 ms. An O-source pulse time is 200 to 1000 ms. An Al-source pulse time is 50 to 300 ms. An entire reaction chamber maintains a uniform temperature, with a reaction temperature of 200 to 400° C. and a gas flow rate controlled at 50 to 800 sccm.

The specific steps are as follows.

1) depositing a $SiO_2$ loose layer, which is doped with $GeO_2$ and $P_2O_5$ to increase the refractive index, on an inner wall of a quartz tube by using an MCVD technology, controlling a temperature to semi-vitrify the layer, and creating an ALD deposition environment to form the first loose layer 1;
2) sequentially depositing doping materials based on a sequence of $Al_2O_3$, bismuth oxide and PbO by using an ALD technology to form a first core layer 2;
3) depositing a $SiO_2$ material doped with $GeO_2$ and $P_2O_5$ by using the MCVD technology and semi-vitrifying the $SiO_2$ material to form a second loose layer 3;
4) placing the substrate tube in a direction reverse to that in step 2 and performing deposition by using the ALD technology to further enhance doping uniformity, depositing $Al_2O_3$, bismuth oxide and PbO materials again on the second loose layer based on the deposition sequence and doping molar ratios in step 2 to form a second core layer 4;
5) by using the MCVD technology, depositing a $SiO_2$ material doped with $GeO_2$ and $P_2O_5$ to increase the refractive index, semi-vitrifying the deposited material to form an inner core 5, finally, performing high-temperature preform collapsing and drawing a fiber preform into an optical fiber by using a drawing tower.

The present disclosure has following beneficial effects:

1. $Al_2O_3$, bismuth oxide, and PbO materials are sequentially deposited within the fiber core using the ALD technology, with a molar ratio of $Al_2O_3$ to bismuth oxide around 0.5 to 20 and a molar ratio of bismuth oxide to PbO around 0.2 to 30. The gain performance of the optical fiber is regulated by controlling the doping molar ratios of $Al_2O_3$, bismuth oxide and PbO.
2. The Bi/Pb/P/Ge co-doped silica optical fiber exhibits multiple absorption peaks in the wavelength range of 400-1700 nm, and the Bi-related absorption peak is broadened near 1000 nm.
3. Within the wavelength range of 1260-1460 nm, the Bi/Pb/P/Ge co-doped silica optical fiber maintains gains exceeding 15 dB, notably achieving a gain over 20 dB at 1420 nm.
4. The optical fiber has a simple structure, with controllable and uniformly distributed doping concentrations, and is thus suitable for widespread applications in active optical fiber amplifiers, high-order vortex optical amplifiers, fiber lasers, fiber sensors and other related fields.

DETAILED DESCRIPTION OF THE EMBODIMENTS

The present disclosure will be described in detail below with reference to the drawings and specific embodiments.

Embodiment

Figure 1:
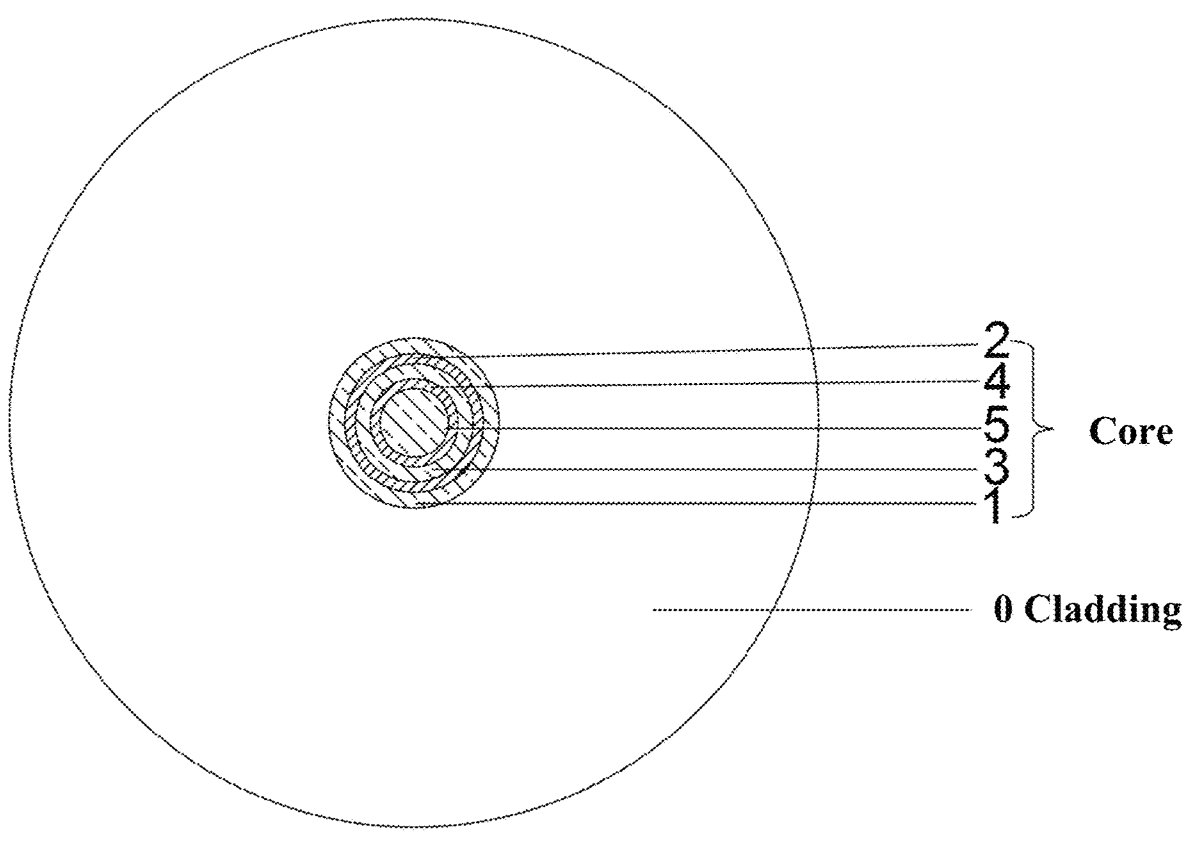
FIG. 1 is a schematic structural diagram of an optical fiber prepared according to the present disclosure.
Figure 2:
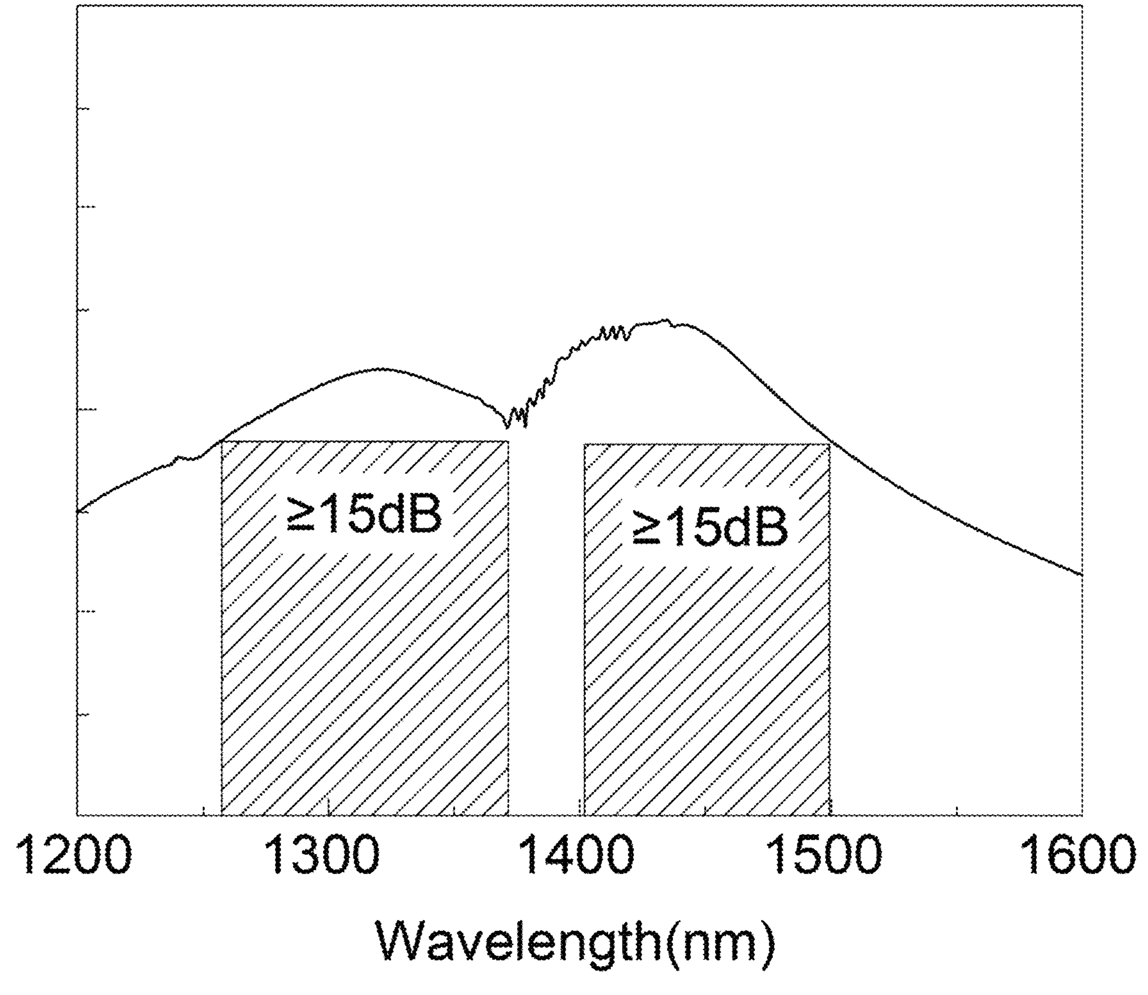
FIG. 2 is a schematic diagram of spectral width of the optical fiber prepared according to the present disclosure.
Figure 3:
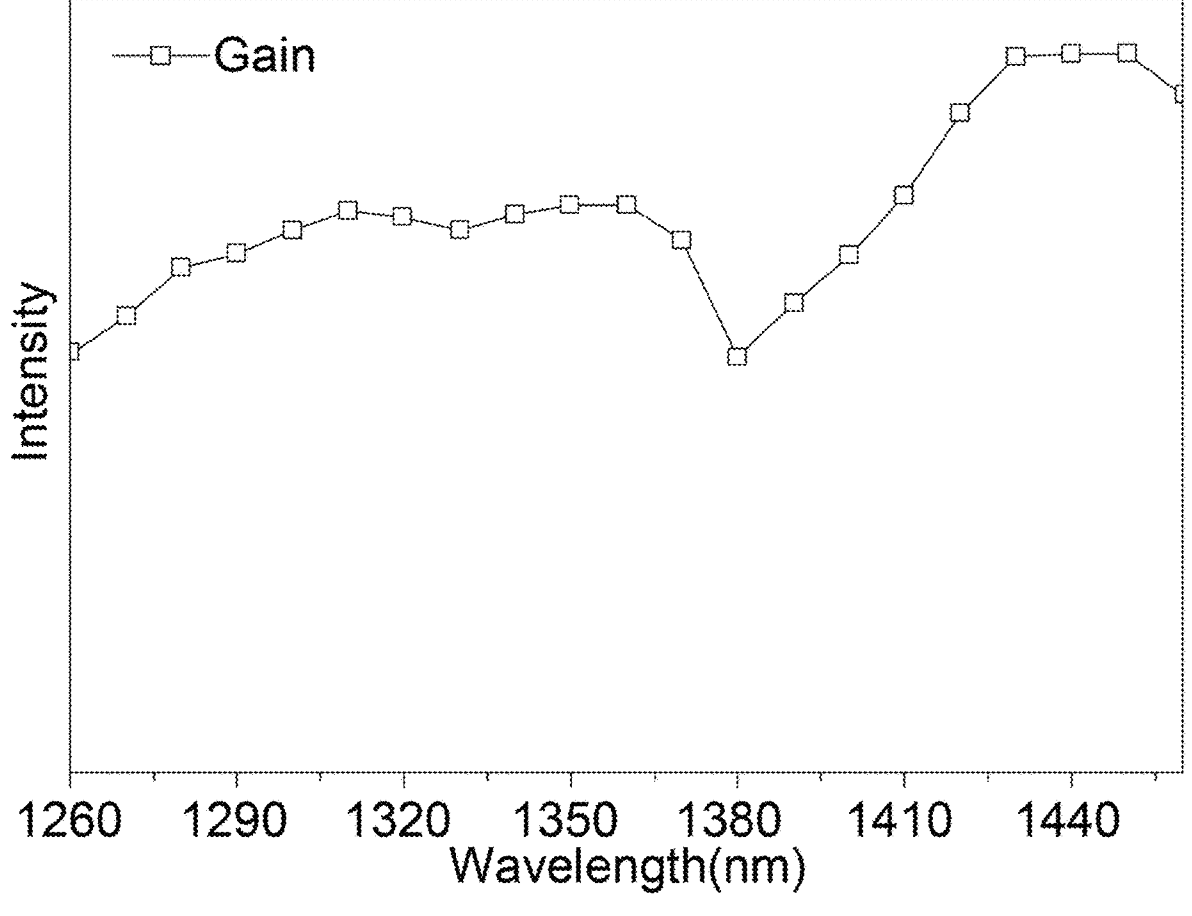
FIG. 3 is a schematic diagram of gain of the optical fiber prepared according to the present disclosure.

Referring to FIG. 2 and FIG. 3, a method for regulating the gain and bandwidth of a bismuth-doped silica optical fiber is provided. Firstly, a $SiO_2$ loose layer doped with high-refractive-index $GeO_2$ and $P_2O_5$ was deposited on an inner wall of a quartz tube by using an MCVD technology and semi-vitrified to form the first loose layer 1. Then, doping materials were deposited based on a sequence of $Al_2O_3$, bismuth oxide and PbO by using an ALD technology to form the first core layer 2. During this process, deposition parameters such as deposition temperature, precursor pulse time, vapor pressure and deposition cycles during the ALD were controlled to precisely control deposition concentrations of various doping materials, achieving a molar ratio of $Al_2O_3$ to bismuth oxide being 0.5 to 10 and a molar ratio of bismuth oxide to PbO being 0.2 to 15. A $SiO_2$ material doped with $GeO_2$ and $P_2O_5$ was deposited and semi-vitrified to form the second loose layer 3. Then, $Al_2O_3$, bismuth oxide and PbO materials were deposited on the second loose layer again based on the same deposition sequence and doping molar ratios by using the ALD technology to form the second core layer 4. Finally, a silica material doped with high-refractive-index $GeO_2$ and $P_2O_5$ was deposited by using the MCVD technology and semi-vitrified to form the inner core 5. Further, preform collapsing at high-temperature was performed and an optical fiber preform was drawn by using a drawing tower to form an optical fiber.

Fluorescence intensity with different doping ratios is shown in the table below:

| Optical fiber | Al/Bi | Bi/Pb | Fluorescence Intensity (dBm) |
|---|---|---|---|
| BDF-1 | 3 | 1.2 | −50 |
| BDF-2 | 5.3 | 14 | −56 |
| BDF-3 | 2 | 1.9 | −38 |
| BDF-4 | 1.3 | 1.8 | −30 |
| BDF-5 | 1.5 | 1.7 | −26 |

From the table, it can be observed that by adjusting the molar ratios of $Al_2O_3$, bismuth oxide and PbO, the gain performance of the optical fiber can be controlled. When both Al/Bi and Bi/Pb molar ratios are in the range of 1-2, the fluorescence intensity can effectively be increased.

What is claimed is:

1. A method for regulating fiber bandwidth and gain in an O+E band, comprising: depositing a $SiO_2$ material doped with $GeO_2$ and $P_2O_5$ on an inner wall of a substrate tube to form a first loose layer (1); sequentially depositing $Al_2O_3$, bismuth oxide, and PbO on the first loose layer (1); then depositing the $SiO_2$ material doped with $GeO_2$ and $P_2O_5$ again to form a second loose layer; sequentially depositing $Al_2O_3$, bismuth oxide, and PbO on the second loose layer; and finally, depositing a silica material doped with $GeO_2$ and $P_2O_5$ and performing preform collapsing and fiber drawing to form an optical fiber, wherein gain performance of the optical fiber is regulated by controlling doping molar ratios of $Al_2O_3$, bismuth oxide and PbO.

2. The method for regulating fiber bandwidth and gain in an O+E band according to claim 1, wherein a molar ratio of $Al_2O_3$ to bismuth oxide is 0.5 to 20 and a molar ratio of bismuth oxide to PbO is 0.2 to 30.

3. The method for regulating fiber bandwidth and gain in an O+E band according to claim 1, wherein when an atomic layer deposition (ALD) technology is used to sequentially deposit $Al_2O_3$, bismuth oxide and PbO, an O-source precursor material is ozone or deionized water, an Al-source precursor is trimethylaluminum, a Bi-source precursor is tris(2,2,6,6-tetramethyl-3,5-heptanedionato) bismuth (Bi $(tmhd)_3$) and a Pb-source precursor is bis(2,2,6,6-tetramethyl-3,5-heptanedionato) lead (Pb$(tmhd)_2$).

4. The method for regulating fiber bandwidth and gain in an O+E band according to claim 3, wherein a Bi-source heating temperature is controlled at 200 to 300° C. with a pulse time of 200 to 400 ms; a Pb-source heating temperature is controlled at 100 to 200° C. with a pulse time of 200 to 400 ms; an O-source pulse time is 200 to 1000 ms; an Al-source pulse time is 50 to 300 ms; an entire reaction chamber maintains a uniform temperature, with a reaction temperature of 200 to 400° C. and a gas flow rate controlled at 50 to 800 sccm.

5. The method for regulating fiber bandwidth and gain in an O+E band according to claim 1, comprising the following specific steps:

1) depositing a $SiO_2$ loose layer, which is doped with $GeO_2$ and $P_2O_5$ for increasing an refractive index, on an inner wall of a quartz tube by using a modified chemical vapor deposition (MCVD) technology, controlling a temperature to semi-vitrify the layer and creating an ALD deposition environment to form the first loose layer (1);
2) sequentially depositing doping materials based on a sequence of $Al_2O_3$, bismuth oxide and PbO by using the ALD technology to form a first core layer (2);
3) depositing a $SiO_2$ material doped with $GeO_2$ and $P_2O_5$ by using the MCVD technology and semi-vitrifying the $SiO_2$ material to form a second loose layer (3);
4) placing the substrate tube in a direction reverse to that in step 2) and performing deposition by using the ALD technology: depositing $Al_2O_3$, bismuth oxide, and PbO materials again on the second loose layer based on the deposition sequence and doping molar ratios in step 2), to form a second core layer (4);
5) by using the MCVD technology, depositing a $SiO_2$ material doped with $GeO_2$ and $P_2O_5$ for increasing the refractive index, semi-vitrifying the deposited material to form an inner core (5), finally, performing high-temperature preform collapsing and drawing a fiber preform into an optical fiber by using a drawing tower.

6. The method for regulating fiber bandwidth and gain in an O+E band according to claim 2, comprising the following specific steps:

1) depositing a $SiO_2$ loose layer, which is doped with $GeO_2$ and $P_2O_5$ for increasing an refractive index, on an inner wall of a quartz tube by using a modified chemical vapor deposition (MCVD) technology, controlling a temperature to semi-vitrify the layer and creating an ALD deposition environment to form the first loose layer (1);
2) sequentially depositing doping materials based on a sequence of $Al_2O_3$, bismuth oxide and PbO by using the ALD technology to form a first core layer (2);
3) depositing a $SiO_2$ material doped with $GeO_2$ and $P_2O_5$ by using the MCVD technology and semi-vitrifying the $SiO_2$ material to form a second loose layer (3);
4) placing the substrate tube in a direction reverse to that in step 2) and performing deposition by using the ALD technology: depositing $Al_2O_3$, bismuth oxide, and PbO materials again on the second loose layer based on the deposition sequence and doping molar ratios in step 2), to form a second core layer (4);
5) by using the MCVD technology, depositing a $SiO_2$ material doped with $GeO_2$ and $P_2O_5$ for increasing the refractive index, semi-vitrifying the deposited material to form an inner core (5), finally, performing high-temperature preform collapsing and drawing a fiber preform into an optical fiber by using a drawing tower.

7. The method for regulating fiber bandwidth and gain in an O+E band according to claim 3, comprising the following specific steps:

1) depositing a $SiO_2$ loose layer, which is doped with $GeO_2$ and $P_2O_5$ for increasing an refractive index, on an inner wall of a quartz tube by using a modified chemical vapor deposition (MCVD) technology, controlling a temperature to semi-vitrify the layer and creating an ALD deposition environment to form the first loose layer (1);
2) sequentially depositing doping materials based on a sequence of $Al_2O_3$, bismuth oxide and PbO by using the ALD technology to form a first core layer (2);

3) depositing a $SiO_2$ material doped with $GeO_2$ and $P_2O_5$ by using the MCVD technology and semi-vitrifying the $SiO_2$ material to form a second loose layer (3);

4) placing the substrate tube in a direction reverse to that in step 2) and performing deposition by using the ALD technology: depositing $Al_2O_3$, bismuth oxide, and PbO materials again on the second loose layer based on the deposition sequence and doping molar ratios in step 2), to form a second core layer (4);

5) by using the MCVD technology, depositing a $SiO_2$ material doped with $GeO_2$ and $P_2O_5$ for increasing the refractive index, semi-vitrifying the deposited material to form an inner core (5), finally, performing high-temperature preform collapsing and drawing a fiber preform into an optical fiber by using a drawing tower.

8. The method for regulating fiber bandwidth and gain in an O+E band according to claim 4, comprising the following specific steps:

1) depositing a $SiO_2$ loose layer, which is doped with $GeO_2$ and $P_2O_5$ for increasing an refractive index, on an inner wall of a quartz tube by using a modified chemical vapor deposition (MCVD) technology, controlling a temperature to semi-vitrify the layer and creating an ALD deposition environment to form the first loose layer (1);

2) sequentially depositing doping materials based on a sequence of $Al_2O_3$, bismuth oxide and PbO by using the ALD technology to form a first core layer (2);

3) depositing a $SiO_2$ material doped with $GeO_2$ and $P_2O_5$ by using the MCVD technology and semi-vitrifying the $SiO_2$ material to form a second loose layer (3);

4) placing the substrate tube in a direction reverse to that in step 2) and performing deposition by using the ALD technology: depositing $Al_2O_3$, bismuth oxide, and PbO materials again on the second loose layer based on the deposition sequence and doping molar ratios in step 2), to form a second core layer (4);

5) by using the MCVD technology, depositing a $SiO_2$ material doped with $GeO_2$ and $P_2O_5$ for increasing the refractive index, semi-vitrifying the deposited material to form an inner core (5), finally, performing high-temperature preform collapsing and drawing a fiber preform into an optical fiber by using a drawing tower.

* * * * *